United States Patent [19]

Schroeder

[11] 4,121,391
[45] Oct. 24, 1978

[54] FASTENING OF CURTAIN WALL TO BUILDING AND CLIP THEREFOR

[75] Inventor: Donald Earl Schroeder, Brookfield, Wis.

[73] Assignee: Inryco, Inc., Melrose Park, Ill.

[21] Appl. No.: 744,974

[22] Filed: Nov. 26, 1976

[51] Int. Cl.² ............................................. E04F 13/00
[52] U.S. Cl. ..................................... 52/235; 52/357;
52/489; 52/584; 403/403; 403/405
[58] Field of Search ................ 52/234, 127, 208, 238,
52/243, 281, 357, 360, 463, 481, 489, 493, 502,
509, 512, 584; 403/403, 405

[56] References Cited

U.S. PATENT DOCUMENTS

| | | | |
|---|---|---|---|
| 1,078,144 | 11/1913 | Jester | 52/357 |
| 3,251,168 | 5/1966 | Waring et al. | 52/235 X |
| 3,892,054 | 7/1975 | Matson | 52/584 X |

FOREIGN PATENT DOCUMENTS 66,127  4/1943  Norway ...................... 52/489

*Primary Examiner*—J. Karl Bell
*Attorney, Agent, or Firm*—Merriam, Marshall & Bicknell

[57] ABSTRACT

In a building having floors or roof resting on peripheral beams supported by columns and non-load bearing curtain walls enclosing the building, the improvement comprising a plurality of vertical members, constituting part of the curtain wall framing, having at least one flange perpendicular to a horizontal member joined to the building, and a plurality of metal clips joined to the horizontal member and securing the vertical member flange against horizontal movement but permitting unrestrained vertical displacement of the adjoining horizontal member relative to the vertical members which are a part of the curtain wall. In this way, roof and floor deflections do not apply compressive forces to the curtain walls.

Each clip may be made of sheet metal and have a planar metal body of substantially uniform thickness, with or without an integral planar metal flange laterally extending from the metal body, and an elongated opening of uniform width in the metal body extending inwardly from the lateral flange with said opening being adapted to snugly receive a vertical flange of a wall vertical member of a curtain wall.

4 Claims, 5 Drawing Figures

FASTENING OF CURTAIN WALL TO BUILDING AND CLIP THEREFOR

This invention relates to building construction and prefabricated parts used therein. More particularly, this invention concerns buildings having non-load bearing curtain walls and prefabricated parts used to attach the walls to the building framework.

Most large buildings being constructed at this time for residential, commercial and institutional purposes utilize a skeleton framework which supports all loads. The skeleton framework comprises a plurality of spaced-apart vertical columns which support the ends of horizontal beams, usually positioned at, and for the purpose of supporting, each floor or the roof. Each such building has a number of columns and beams at its peripheral sides or surfaces. The skeleton framework is generally covered with non-load bearing curtain walls which are connected to the peripheral floor or roof structure.

The floors or roof of the described buildings are designed to bear calculated maximum loads but to permit the live load applied to cause a significant deflection of the floors or roof and connected structure because of the wide spans between columns. rigid unyielding connection of curtain walls to the floor and/or roof and connected structure can result in beam and floor deflections applying compressive forces to the curtain walls. These forces can be sufficiently high to distort and damage the walls. Furthermore, the forces are not generally predictable because the actual load applied to a floor or roof, and thus to its supporting beam, can vary greatly during a period of time as the use of the floor, or load on the roof, changes. A means is thus needed which will permit ready attachment of curtain walls to a building skeleton framework but which will avoid or minimize the transfer of floor and roof framing into forces which significantly affect the curtain wall integrity.

According to one aspect of the invention, there is provided an improvement in a building having a single or plurality of floors and roof structure supported by columns and having non-load bearing curtain walls enclosing the building. The improvement comprises a plurality of vertical members, constituting part of the curtain wall framing, having at least one flange perpendicular to a horizontal member joined to the building, and a plurality of metal clips joined to the horizontal member and securing the vertical member flange of the curtain wall framing against horizontal movement but permitting unrestrained vertical displacement of the adjoining horizontal member relative to the vertical members of the curtain wall.

According to a second aspect of the invention, each of the metal clips is made of sheet metal and comprises a planar metal body of substantially uniform thickness, with or without an integral planar metal flange laterally extending from the metal body, and an elongated opening of uniform width in the metal body extending inwardly from the lateral flange with said opening being adapted to snugly receive a vertical flange of a wall vertical member.

The invention will be described further in conjunction with the attached drawings, in which.

So far as is practical, the same elements or parts which are illustrated in the different views of the drawings shall be identified by the same numbers.

Figure 1:
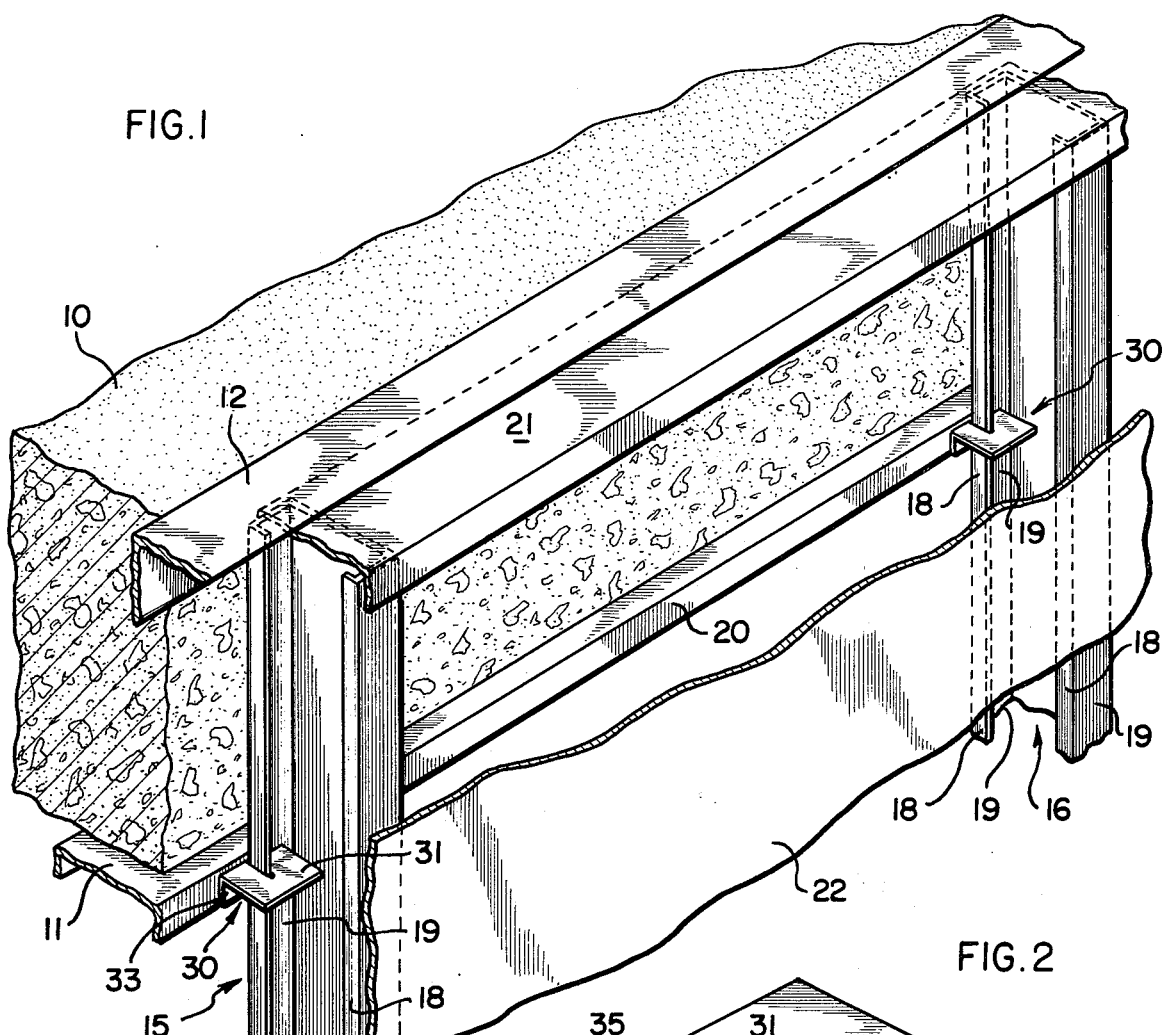
FIG. 1 is an isometric view of a partial building showing a curtain wall joined thereto.
Figure 2:
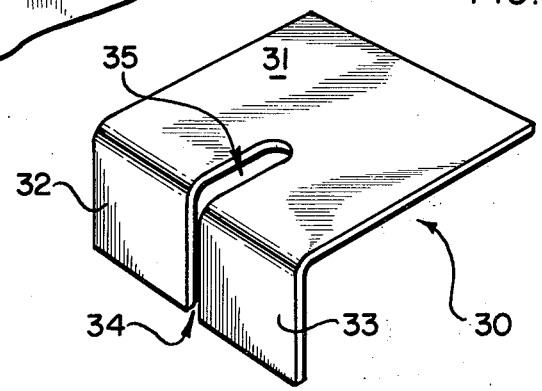
FIG. 2 is an isometric view of a clip used to fasten the curtain wall to the horizontal beams of the building of FIG. 1.
Figure 3:
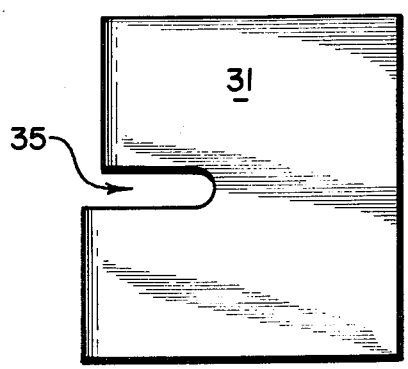
FIG. 3 is a plan view of the clip of FIG. 2.
Figure 4:
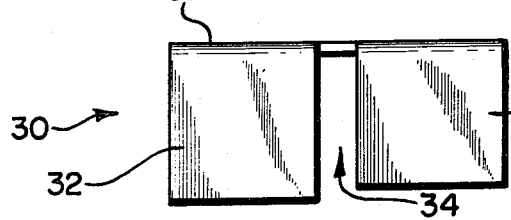
FIG. 4 is a front elevational view of the clip of FIG. 2.
Figure 5:
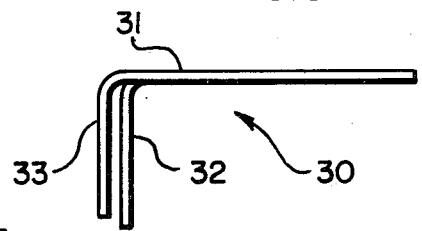
FIG. 5 is a side elevational view of the clip of FIG. 2.

With reference to FIG. 1, the floor or roof 10 is part of a skeleton framework building of vertical columns and horizontal beams. Beneath the outer edge of floor 10 is positioned inverted horizontal channel 11 joined securely to the floor, roof, beams and/or columns of the building. In some forms of building construction, channel 11 may be the main supporting beam between columns or it may be a separate member as shown in the drawing. In each case, however, the channel or beam is subjected to loads applied to the floor or roof which result in deflection of the channel or beam.

Horizontal angle 12, shown joined to the top peripheral edge of floor 10 in FIG. 1, provides a support plate for the next upper curtain wall section.

The curtain wall framing section 15 shown in FIG. 1 has a plurality of vertical channel shaped members 16. Vertical member 16 is a channel with two flanges 18 and 19 at each side edge and with flange 19 in contact with the front vertical face 20 of channel 11. Top plate 21 is supported by the ends of vertical members 16 which are joined thereto, such as by welding. Sufficient clearance is provided between the top surface of plate 21 and angle 12 to avoid any transfer of loads to plate 21 when angle 12 deflects under load.

Any suitable ties or spacers (not shown) can be used to join adjacent vertical members 16 together to help maintain their spaced apart position and give rigidity to the curtain wall. A suitable facing 22 is fastened to the vertical members 16 to complete the barrier wall section 15.

The barrier wall section 15 is attached to the building skeleton by clips 30. The structure of each clip 30 as shown in FIGS. 2 to 5. The clip 30 is made of sheet metal of uniform thickness and has a planar metal body 31. A pair of integral planar metal flanges 32 and 33 parallel to each other laterally extend from the metal body 31 with a gap 34 of uniform width between adjacent side edges of the flanges. An elongated opening 35 of uniform width extends inwardly in the metal body 31. The opening 35 has the same width as gap 34 and thus constitutes an extension of the gap.

The clip embodiment shown in the drawings has a planar metal flange 33 located outwardly beyond but parallel to the flange 32 for a distance about equal to the thickness of flange 19 of vertical member 16. As a result, when clip 30 is positioned with flange 18 in gap 34 and in opening 35, the clip flange 33 contacts the face of flange 20 of channel 11 while the clip flange 32 contacts the face of flange 19. Flange 18 fits snugly in gap 34 and opening 35 since they are dimensioned to be only slightly wider than the thickness of flange 18. Clip flange 33 is joined by welding or bolts to flange 20 but clip flange 32 is not fastened or connected to vertical member 16. No connection between the clip and the barrier wall is made. As a result, any deflection of channel member 11 is accommodated by vertical sliding movement of clip 30 relative to the vertical member 16. As a result, the floor or roof and supporting horizontal beam deflection will not result in transfer of any appreciable load to the non-load bearing barrier wall 15 while at the same time vertical member 16 is prevented from moving in any horizontal direction.

Although the clip 30 has flanges 32 and 33, it is within the contemplation of the invention to eliminate these flanges completely, such as by terminating body 31 where it joins flanges 32 and 33. such a clip has most of the advantages of the clip with flanges 32 and 33.

The clip of this invention is useful even when the vertical member 16 may comprise a single flange 18 without flange or channel side wall 19 since it will serve to hold the vertical member against horizontal displacement while permitting vertical movement of the building floor or roof with increased or decreased loads without applying a load to the barrier wall.

The clip 30 as illustrated in FIGS. 2 to 5 is a rectangular blank before the flanges 32 and 33 are created by bending down the ends of the blank. The bends are not made in the same line so that flange 32 is set back from flange 33. This results in the end of flange 32 extending downwardly somewhat beyond the end of flange 33.

The foregoing detailed description has been given for clearness of understanding only, and no unnecessary limitations should be understood therefrom, as modifications will be obvious to one skilled in the art.

What is claimed is:

1. A metal clip comprising:

a planar metal body of substantially uniform thickness, a pair of integral planar metal flanges parallel to each other and laterally extending from the metal body with a gap of uniform width between adjacent side edges of the flanges, an elongated opening of about uniform width in the metal body extending inwardly from, and having about the same width as, the gap, with said opening being adapted to snugly receive a vertical flange of a curtain wall vertical member; and one of the planar metal flanges being located outwardly beyond the other planar metal flange for a distance about equal to the thickness of a curtain wall vertical member flange whereby the outwardly extending planar metal flange can be fastened to a horizontal member on a building with the inner planar metal flange in contact with a flange of the curtain wall vertical member and with a flange of the curtain wall vertical member in the gap and in the elongated opening.

2. In a building having a plurality of floors or roof construction supported by columns and non-load bearing curtain walls enclosing the building, the improvement comprising:

a plurality of vertical members, constituting part of the curtain wall framing, having at least one flange perpendicular to a horizontal member joined to the building, and a plurality of metal clips joined to the horizontal member, each clip having a planar metal body of substantially uniform thickness, a pair of integral planar metal flanges parallel to each other and laterally extending from the metal body with a gap of about uniform width between adjacent side edges of the flanges, and an elongated opening of about uniform width in the metal body extending inwardly from, and having about the same width as, the gap, with said gap and opening receiving a curtain wall vertical member, and one of the clip flanges being joined to the horizontal member, whereby the clips secure the curtain wall vertical member flanges against horizontal movement but permit unrestrained vertical displacement of the adjoining horizontal member relative to the curtain wall vertical members.

3. The improvement according to claim 1 in which each vertical wall member is a channel in section, formed with two flanges, with the second flange of each vertical wall member being adjacent the horizontal member and the other flange of each clip adjoins the vertical member second flange.

4. The improvement according to claim 2 in which each vertical wall member has two flanges, with the second flange of each vertical wall member being adjacent the horizontal member and the other flange of each clip adjoins the vertical member second flange.

* * * * *